United States Patent
Guzik (10) Patent No.: US 11,720,414 B2
(45) Date of Patent: Aug. 8, 2023

(54) PARALLEL EXECUTION CONTROLLER FOR PARTITIONED SEGMENTS OF A DATA MODEL

(71) Applicants: Getac Technology Corporation, Taipei (TW); WHP Workflow Solutions, Inc., North Charleston, SC (US)

(72) Inventor: Thomas Guzik, Edina, MN (US)

(73) Assignees: WHP Workflow Solutions, Inc., North Charleston, SC (US); Getac Technology Corporation, Taipei (TW)

( * ) Notice: Subject to any disclaimer, the term of this patent is extended or adjusted under 35 U.S.C. 154(b) by 49 days.

(21) Appl. No.: 17/107,708

(22) Filed: Nov. 30, 2020

(65) Prior Publication Data

US 2022/0171664 A1 Jun. 2, 2022

(51) Int. Cl.
*G06F 9/50* (2006.01)
*H04L 67/1008* (2022.01)
*H04L 67/75* (2022.01)

(52) U.S. Cl.
CPC .......... *G06F 9/5083* (2013.01); *G06F 9/5077* (2013.01); *H04L 67/1008* (2013.01); *H04L 67/75* (2022.05)

(58) Field of Classification Search
CPC . G06F 9/5083; G06F 9/5077; H04L 67/1008; H04L 67/75
See application file for complete search history.

(56) References Cited

U.S. PATENT DOCUMENTS

| | | | |
|---|---|---|---|
| 6,760,744 B1 * | 7/2004 | Halaas | G06F 15/17343 709/201 |
| 7,917,888 B2 | 3/2011 | Chong et al. | |
| 8,452,722 B2 | 5/2013 | Naeve et al. | |
| 8,606,844 B2 | 12/2013 | Kaufman et al. | |
| 8,688,320 B2 | 4/2014 | Faenger | |
| 9,110,774 B1 | 8/2015 | Bonn et al. | |

(Continued)

FOREIGN PATENT DOCUMENTS

| | | |
|---|---|---|
| CN | 109671266 B | 11/2020 |
| JP | 2008204219 A | 9/2008 |

(Continued)

OTHER PUBLICATIONS

Wang et al., Supporting Very Large Models using Automatic Dataflow Graph Partitioning, 2019 (Year: 2019).*

(Continued)

*Primary Examiner* — Jorge A Chu Joy-Davila
(74) *Attorney, Agent, or Firm* — Han Santos, PLLC (57) ABSTRACT

This disclosure describes techniques that enable a parallel execution controller to execute partitioned segments of a data model in parallel and on different network resources. The resultant processed data from each partitioned segment may be combined to form an aggregated set of results data. The parallel execution controller may identify model attributes of a data model and determine whether the data model is partitionable, based on the model attributes. If the data model is partitionable, the parallel execution controller may partition the data model, initiate a parallel execution of the individual partitioned segments on available network resources, and combine the corresponding results data into an aggregated set of results data.

19 Claims, 6 Drawing Sheets

(56) References Cited

U.S. PATENT DOCUMENTS

| | | | |
|---|---|---|---|
| 9,264,678 B2 | 2/2016 | Nuyttens et al. | |
| 9,449,229 B1 | 9/2016 | Laska et al. | |
| 9,483,732 B1 | 11/2016 | Milakovich | |
| 9,485,474 B2 | 11/2016 | Kim et al. | |
| 9,681,104 B2 | 6/2017 | Billau et al. | |
| 9,723,251 B2 | 8/2017 | Slotky | |
| 9,738,125 B1 | 8/2017 | Brickley et al. | |
| 9,755,890 B2 | 9/2017 | Robertson et al. | |
| 9,832,205 B2 | 11/2017 | Santhi et al. | |
| 9,848,312 B2 | 12/2017 | Sundel et al. | |
| 9,852,132 B2 | 12/2017 | Chhichhia et al. | |
| 9,886,261 B1 | 2/2018 | Hotchkies | |
| 10,324,773 B2 | 6/2019 | Wing et al. | |
| 10,460,014 B2 | 10/2019 | Lloyd et al. | |
| 10,540,883 B1 | 1/2020 | Keil et al. | |
| 10,902,955 B1 | 1/2021 | Federoff et al. | |
| 11,238,290 B2 | 2/2022 | Burns et al. | |
| 2003/0081127 A1 | 5/2003 | Kirmuss | |
| 2003/0095688 A1 | 5/2003 | Kirmuss | |
| 2003/0163512 A1* | 8/2003 | Mikamo | G06F 9/5066 718/102 |
| 2003/0208679 A1 | 11/2003 | Vazquez | |
| 2006/0257001 A1 | 11/2006 | Veen et al. | |
| 2008/0147267 A1 | 6/2008 | Plante et al. | |
| 2008/0303903 A1 | 12/2008 | Bentley et al. | |
| 2009/0150017 A1 | 6/2009 | Caminiti et al. | |
| 2009/0210455 A1 | 8/2009 | Sarkar et al. | |
| 2009/0248711 A1 | 10/2009 | Martinez et al. | |
| 2009/0284359 A1 | 11/2009 | Huang et al. | |
| 2010/0036560 A1 | 2/2010 | Wright et al. | |
| 2010/0144318 A1 | 6/2010 | Cable | |
| 2011/0205068 A1 | 8/2011 | Huynh et al. | |
| 2011/0302151 A1* | 12/2011 | Abadi | G06F 16/2456 707/E17.017 |
| 2012/0084747 A1* | 4/2012 | Chakradhar | G06F 9/5066 717/104 |
| 2013/0039542 A1 | 2/2013 | Guzik | |
| 2013/0344856 A1 | 12/2013 | Silver et al. | |
| 2013/0347005 A1* | 12/2013 | Lam | G06F 9/4843 719/318 |
| 2014/0343796 A1 | 11/2014 | Abuelsaad et al. | |
| 2015/0089019 A1 | 3/2015 | Chou | |
| 2015/0341370 A1 | 11/2015 | Khan | |
| 2016/0042767 A1 | 2/2016 | Araya et al. | |
| 2016/0086397 A1 | 3/2016 | Phillips | |
| 2016/0153801 A1 | 6/2016 | Cho et al. | |
| 2016/0190859 A1 | 6/2016 | Blum et al. | |
| 2016/0248856 A1 | 8/2016 | Kao | |
| 2016/0342447 A1* | 11/2016 | Richter | G06F 11/3414 |
| 2016/0371553 A1 | 12/2016 | Farnham, IV et al. | |
| 2016/0378607 A1* | 12/2016 | Kumar | G06F 13/16 711/154 |
| 2017/0011324 A1 | 1/2017 | Truong et al. | |
| 2017/0048482 A1 | 2/2017 | Drako et al. | |
| 2017/0148027 A1 | 5/2017 | Yu et al. | |
| 2017/0161323 A1* | 6/2017 | Simitsis | G06F 16/248 |
| 2017/0161409 A1 | 6/2017 | Martin | |
| 2017/0164062 A1 | 6/2017 | Abramov et al. | |
| 2017/0339021 A1* | 11/2017 | Dukatz | H04L 41/145 |
| 2018/0079413 A1 | 3/2018 | Herrero et al. | |
| 2018/0145923 A1 | 5/2018 | Chen et al. | |
| 2018/0285759 A1 | 10/2018 | Wood et al. | |
| 2018/0365909 A1 | 12/2018 | Cheng et al. | |
| 2019/0019122 A1 | 1/2019 | Allen | |
| 2019/0026665 A1 | 1/2019 | Caskey et al. | |
| 2019/0043351 A1 | 2/2019 | Yang et al. | |
| 2019/0054925 A1 | 2/2019 | Froeschl et al. | |
| 2019/0140886 A1 | 5/2019 | Zywicki et al. | |
| 2019/0325354 A1 | 10/2019 | Rajnayak et al. | |
| 2020/0007827 A1 | 1/2020 | Saad et al. | |
| 2020/0072637 A1 | 3/2020 | Guidotti et al. | |
| 2020/0074156 A1 | 3/2020 | Janumpally et al. | |
| 2020/0081899 A1 | 3/2020 | Shapur et al. | |
| 2020/0145620 A1 | 5/2020 | Alcantara et al. | |
| 2020/0151360 A1 | 5/2020 | Zavesky et al. | |
| 2020/0172112 A1 | 6/2020 | Kawashima | |
| 2020/0211216 A1 | 7/2020 | Hagio et al. | |
| 2020/0304854 A1 | 9/2020 | Baumgartner et al. | |
| 2020/0312046 A1 | 10/2020 | Righi et al. | |
| 2020/0351381 A1 | 11/2020 | Lacey et al. | |
| 2021/0076002 A1 | 3/2021 | Peters et al. | |
| 2021/0089374 A1 | 3/2021 | Watson et al. | |
| 2021/0133808 A1 | 5/2021 | Chan et al. | |
| 2021/0136277 A1 | 5/2021 | McFarlane | |
| 2021/0272702 A1 | 9/2021 | Hakami | |
| 2021/0297929 A1 | 9/2021 | Frusina et al. | |
| 2021/0377205 A1 | 12/2021 | Brown et al. | |
| 2022/0014907 A1 | 1/2022 | Boyd et al. | |
| 2022/0169258 A1 | 6/2022 | Samarthyam et al. | |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

U.S. Appl. No. 17/107,891, Final Office Action dated Aug. 5, 2021, 21 pages.

U.S. Appl. No. 17/107,877, Office Action dated Aug. 18, 2021, 40 pages.

U.S. Appl. No. 17/107,891, Office Action dated Apr. 1, 2021, 22 pages.

U.S. U.S. Appl. No. 17/107,764, Notice of Allowance dated May 26, 2022, 26 pages.

U.S. Appl. No. 17/107,785, Office Action dated Jul. 7, 2022, 21 pages.

International Patent Application No. PCT/US2021/060890, International Search Report and Written Opinion dated Mar. 21, 2022, 11 pages.

International Patent Application No. PCT/US2021/060892, International Search Report and Written Opinion dated Mar. 21, 2022, 10 pages.

International Patent Application No. PCT/US2021/060893, International Search Report and Written Opinion dated Mar. 21, 2022, 9 pages.

International Patent Application No. PCT/US2021/060894, International Search Report and Written Opinion dated Mar. 21, 2022, 9 pages.

International Patent Application No. PCT/US2021/060895, International Search Report and Written Opinion dated Mar. 21, 9 pages.

International Patent Application No. PCT/US2021/060896, International Search Report and Written Opinion dated Mar. 14, 2022, 11 pages.

Juan Rendon et al. Structural combination of neural network models. 2016 IEEE 16th International Conference on Data Mining Workshops (ICDMW). IEEE Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

MD Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/107,764, Office Action dated Dec. 8, 2021, 38 pages.

U.S. Appl. No. 17/107,785, Final Office Action dated May 11, 2022, 9 pages.

U.S. Appl. No. 17/107,785, Office Action dated Mar. 29, 2022, 30 pages.

U.S. Appl. No. 17/107,824, Notice of Allowance dated May 2, 2022, 34 pages.

U.S. Appl. No. 17/107,824, Notice of Allowance dated Jun. 7, 2022, 33 pages.

U.S. Appl. No. 17/107,824, Office Action dated Dec. 29, 2021, 30 pages.

(56) References Cited

OTHER PUBLICATIONS

U.S. Appl. No. 17/107,830, Office Action dated Jun. 7, 2022, 51 pages.
U.S. Appl. No. 17/107,877, Final Office Action dated Dec. 29, 2021, 40 pages.
U.S. Appl. No. 17/107,891, Notice of Allowance dated Nov. 2, 2021, 23 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
U.S. Appl. No. 17/1017,785, Notice of Allowance dated Nov. 10, 2022, 26 pages.
U.S. Appl. No. 17/107,714. Office Action dated Aug. 18, 2022, 66 pages.
U.S. Appl. No. 17/107,830, Notice of Allowance dated Nov. 9, 2022, 22 pages.
U.S. Appl. No. 17/107,877, Notice of Allowance dated Aug. 22, 2022, 40 pages.
U.S. Appl. No. 17/590,738, Notice of Allowance dated Oct. 5, 2022, 48 pages.
U.S. Appl. No. 17/863,107, Office Action dated Mar. 23, 2023, 32 pages.

\* cited by examiner

PARALLEL EXECUTION CONTROLLER FOR PARTITIONED SEGMENTS OF A DATA MODEL

BACKGROUND

Many organizations and businesses rely on dedicated computing systems to analyze data-related workloads. Organizations may select computing platforms based on the complexity of their current or anticipated workloads. For example, an operator may select a computing platform based on any one of a processor type, core count, random access memory (RAM), or any other hardware or software component that is associated with determining a data processing efficiency.

However, as workload complexity increases, more sophisticated computational resources may be required. Typically, a single computing system may struggle to meet the processing demands of complex machine-learning workloads. A next logical step is to distribute a given workload over multiple, loosely connected machines, as illustrated by the concept of grid computing. In grid computing, load sharing allows for the computational capabilities of multiple machines to process a given workload and meet processing demands.

Notwithstanding, while grid computing may increase the availability of computational resources to process a workload of a given complexity, grid computing does not reduce the complexity of the workload, such that it may be processed across fewer and less sophisticated, computational resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques used to enable parallel execution of partitioned segments of a data model on different network resources. A complex data model may be partitioned into logical sub-models that can be combined, shared, reused, and incrementally upgraded. The sub-models may be executed in parallel to one another on different network resources, and re-combined to provide an aggregate set of results data. Since each sub-model is a partition of its larger, parent data model, each sub-model is computationally less complex (e.g. fewer data dimensions). In turn, each sub-model may be executed on network resources that are relatively less sophisticated (e.g. computationally capable) than those required to execute the larger, parent data model. Accordingly, rather than increasing the availability of computational resources to process a workload of a given complexity, this disclosure describes techniques that can reduce the complexity of the workload, such that it may be processed across fewer, less sophisticated, and available computational resources.

A parallel execution controller may be configured to analyze a data model to determine whether the data model is a candidate for partitioning into two or more sub-models. The decision to partition a data model may be based on whether a logical sub-model may be created from a partitioned segment, such that results data from the logical sub-model may be shared, re-used, incrementally upgraded, and re-combined with other partitioned segments to re-form the data model. Following a parallel execution of partitioned segments, the results data of each sub-model (e.g. partitioned segment) may be aggregated to create aggregated results data that are representative of the parent, data model.

In one example, the parallel execution controller may determine that logical sub-models are combinable to re-form a data model based on the underlying model attributes of the data model. The term "data model," as used herein describes a representation of data, relationships between data, and constraints of data needed to support requirements. The requirements, set by a data model administrator, form the basis of establishing intra-relationships within the data, and drawing inferences from the data. "The term "model attributes," as used herein, describes feature characteristics of entity types represented within the data model. Entity types may correspond to objects, individuals, events, or concepts that are represented within a data model. For example, consider a data model used to infer a safety of a law enforcement officer during a dispatch event. In this example, the law enforcement officer (e.g. individual), the law enforcement vehicle (e.g. object), subjects associated with the dispatch event, such as victims, perpetrators, and bystanders (e.g. individuals), the dispatch event itself (e.g. event), and the nature of the dispatch event (e.g. concept), each qualify as entity types.

Accordingly, as explained earlier, model attributes are intended to describe feature characteristics associated with entity types. For example, a model attribute associated with the law enforcement officer may be an officer identity, physical characteristics, or official departmental rank. In another example, a model attribute of a dispatch event (e.g. entity type) may be a characteristic of the dispatch event, such as a traffic infraction, residential property disturbance, or commercial property disturbance. Here, each dispatch event type may qualify as a model attribute of the dispatch event (e.g. entity type), itself.

By way of example, the parallel execution controller may determine a partitionable state of a data model. The partitionable state of a data model may correspond to partitionable or non-partitionable. A partitionable data model can be divided into segments that can shared, re-used, incrementally upgraded, and re-combined to re-form the data model, without impacting the integrity of the data model. A determination of the partitionable state may be based on the model attributes of the data model. For example, a data model may be partitionable based on its underlying model attributes being commutative. Commutative attributes refer to a state in which a data set (e.g. an operand, which in this case refers to the sub-model) may be removed from a data model and then re-combined without impacting the integrity of the data model, itself. If the integrity of the data model is impacted by the act of re-combining the sub-model, the underlying data set is termed as non-commutative. If a sub-model is considered commutative and then modified before being aggregated other sub-models to re-form the data model, the impact of the modified sub-model to the data model is a function of the modification rather than the act of re-combination. Thus, the commutative attribute associated with the sub-model may hold true, despite a data modification to the sub-model occurring before re-combination. A data model may be comprised of commutative and non-commutative model attributes. In this case, the parallel execution controller may seek to partition segments of the data model associated with commutative model attributes and refrain from a partition of segments associated with non-commutative model attributes.

In response to determining a partitionable state of the data model, the parallel execution controller may partition the data model based at least in part on its commutative model attributes. Partitioning the data model may include dividing the data model into segments that are independently executable. Throughout this disclosure partitioned segments may be referred to as sub-models of the data model. Following a partitioning of the data model, the parallel execution controller may analyze each partitioned segment (e.g. sub-model) of the data model to determine processing demand. The parallel execution controller may employ one or more trained machine-learning algorithms to infer a processing demand. The processing demand may be defined as the resource utilization required to execute a sub-model or data model. Processing demand may be expressed as terms of resource component utilizations, such as processor utilization, RAM utilization, or the utilization of any suitable hardware or software component configured to execute a sub-model or a data model. Processing demand may be a function of the size of a sub-model or data model, the dimensionality of the data set, and the complexity of the algorithms being executed. In turn, the parallel execution controller may select available network resources based on processing demand.

Also, the parallel execution controller may identify network resources that are available to execute each sub-model. Network resources may include any suitable electronic device that is communicatively coupled to the parallel execution controller. Electronic devices may include dedicated computing systems, mobile computing systems, or mobile devices.

The parallel execution controller may analyze each available network resource to determine its respective resource capability. Resource capability may be based on the hardware or software components of each network resource, such as processor type, core count, random access memory (RAM), operating system, or any suitable hardware or software component that is associated with determining a data processing efficiency.

In turn, based on a desired data processing efficiency, the parallel execution controller may match a sub-model of given complexity with an available network resource of given resource capability. In some examples, the parallel execution controller may execute a synthetic workload on available network resources to determine resource capability. The synthetic workload may be based on the processing demand of each sub-model, such that a network resource selection may be based on a resource capability that is closely aligned with the processing demand of each sub-model.

For example, the parallel execution controller may execute a synthetic workload that represents a sub-model on a plurality of available network resources. In doing so, the parallel execution controller may monitor resource component utilizations, such as processor utilization, RAM utilization, or the utilization of any suitable hardware or software component configured to execute the synthetic workload. In turn, the parallel execution controller may determine a data processing efficiency based on component utilizations and the time taken to complete the synthetic workload analysis. By executing a synthetic workload on each of the available network resources, the parallel execution controller may correlate available network resources with individual sub-models, based on each sub-model's processing demand.

In some examples, the parallel execution controller may set an affinity of individual network resources to process individual sub-models. Setting an affinity enables the binding and unbinding of a process or thread to a central process unit(s) such that the process or thread will execute only on the designated network resource, rather than any network resource. Setting an affinity also reduces cache problems because there is no delay when the same individual network resource is used.

While the parallel execution controller preferentially seeks to partition a data model into less complex sub-models, an analysis of the data model may determine that it is not amenable to partitioning, based on non-commutative model attributes. In contrast to commutative model attributes, non-commutative refers to a state in which a data set, which is removed from a data model, impacts the integrity of the data model when re-combined. If the integrity of the data model is impacted by the act of re-combing the data set—which is unchanged since being removed—the underlying data set is termed as non-commutative.

In this example, the parallel execution controller may determine a processing demand associated with the unpartitioned data model, and further, identify an available network resource with a compatible resource capability.

Moreover, the parallel execution controller may selectively partition a data model based on real-time user input. For example, user input may include data associated with a portion, but not all, of the model attributes of a data model. The parallel execution controller may analyze the user input, identify the model attributes within the user input, and selectively partition the data model to isolate those model attributes associated with the user input and the requested results.

For example, consider a law enforcement scenario in which a law enforcement officer is attending a dispatch event. At the dispatch event, the law enforcement officer may gather environmental data (e.g. audio data, visual data, and/or so forth) and unobtrusively transmit the environmental data to a network operations center (NOC) as user input. In turn, the NOC may interact with the parallel execution controller to analyze the user input relative to a data model designated to infer officer safety during a dispatch event.

Here, the parallel execution controller may analyze the user input received from the NOC to identify input attributes (or data dimensionality). Input attributes may describe characteristics of entity types. Entity types may include the law enforcement officer, dispatch event, and law enforcement vehicle as entity types. For example, an input attribute of a law enforcement officer may be their official rank, and an input attribute of a dispatch event may be the type of dispatch event (i.e. traffic infraction, residential disturbance, and/or so forth). In turn, the parallel execution controller may identify a data model designated to infer officer safety. The identified data model may be analyzed to identify model attributes that correlate with the input attributes of the user input. The parallel execution controller may further analyze the identified model attributes to determine whether they are commutative or non-commutative. If the identified model attributes are commutative, the parallel execution controller may partition the data model into sub-models based on the identified model attributes. In this way, the parallel execution controller is configured to control the partitioning of the data model, and the corresponding analysis of sub-models based on the data complexity (e.g. data dimensionality/model attributes) of the user input. Doing so avoids processing segments of the data model that are unrelated to the user input.

Further, the term "sub-model" and "partitioned segment" are used interchangeably throughout this disclosure. Also, the term "techniques," as used herein, may refer to system(s), method(s), computer-readable instruction(s), module(s), algorithms, hardware logic, and/or operation(s) as permitted by the context described above and through the document.

Figure 1:
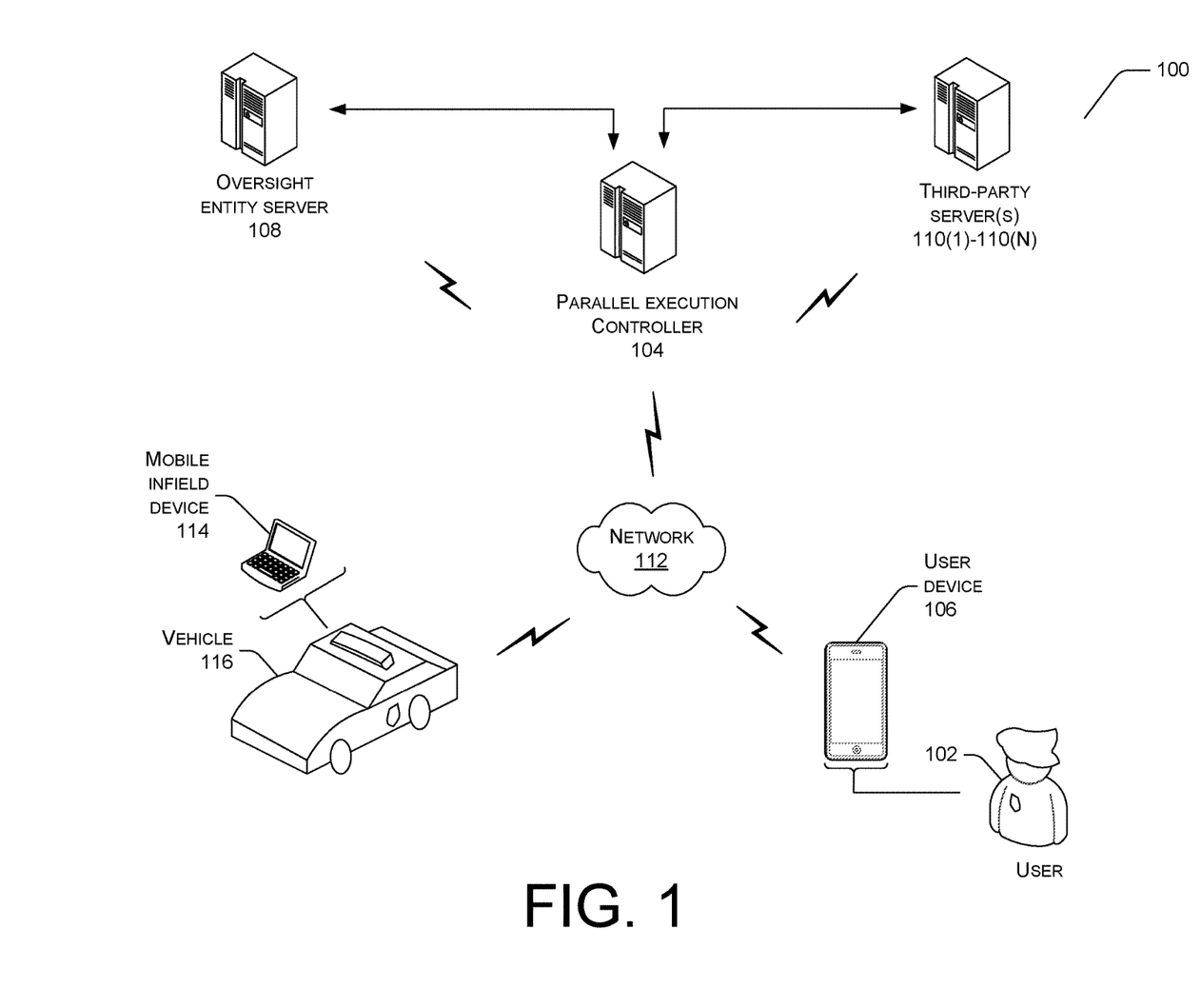
FIG. 1 illustrates an example computing environment that facilitates the operation of the parallel execution controller, in accordance with at least one embodiment.

FIG. 1 illustrates an example computing environment that facilitates the operation of the parallel execution controller, in accordance with at least one embodiment. In the illustrated example, the computing environment 100 is described with reference to a law enforcement setting, whereby a law enforcement officer (e.g. a user 102) interacts remotely with the parallel execution controller 104 via a user device 106. The law enforcement officer, as the user 102, provides the parallel execution controller 104 with user input that is intended for analysis via a multi-dimensional data model. While FIG. 1 presents a computing environment 100 that focuses on a law enforcement use case, one of ordinary skill in the art may appreciate that variations and modifications can be made such that the parallel execution controller 104 may operate to analyze any suitable data model in a public or private enterprise environment. For example, the parallel execution controller 104 may analyze data models associated with engineering and scientific computations, where multi-dimensional data models are typically used.

Referring to FIG. 1, the parallel execution controller 104 may interact with a user device 106 to receive user input. The user input may comprise environmental data associated with the user device 106. The environmental data may include real-time audio data and real-time visual data captured by the user device 106. Environmental data may also include electronic handshake data associated with interactions between the user device 106 and other electronic devices. The electronic handshake data may be based on a communicative interaction between the user device 106 and other electronic devices through a wireless communication protocol, such as BLUETOOTH®.

Further, the user input may also include an analysis request. The parallel execution controller 104 may use the analysis request to select a data model. In some examples, user device 106 may provide the analysis request. In other examples, an oversight entity server 108 may provide the analysis request.

Upon receipt of the user input, the parallel execution controller 104 may analyze the environmental data (e.g. first component of the user input) to identify input attributes. Input attributes describe feature characteristics of objects, individuals, events, or concepts represented within the environmental data. For example, consider a law enforcement officer (e.g. user 102) attending a dispatch event. Input attributes may correspond to characteristics of the law enforcement officer (e.g. departmental rank etc.), individuals attending the dispatch event, and the nature of the dispatch event.

Further, the parallel execution controller 104 may parse through the analysis request (e.g. second component of the user input) to select a data model. Continuing with the previous example, the analysis request may reflect an intent to infer the attending officer's safety during the dispatch event. In that regard, the parallel execution controller 104 may parse through the analysis request to select a data model that infers the attending officer's safety.

The parallel execution controller 104 may select the data model from a data store that resides on the parallel execution controller 104. In another example, the parallel execution controller 104 may interact with one more third-party server(s) 110(1)-110(N) via one or more network(s) 112 to retrieve data model(s) suited for various analyses.

The parallel execution controller 104 may receive additional user input from other electronic devices such as a mobile infield device 114 and an oversight entity server 108, via one or more network(s) 112. The additional user input may comprise environmental data and/or the analysis request. In the context of law enforcement activity, the parallel execution controller 104 may receive user input from a mobile infield device 114 or an oversight entity server 108. The mobile infield device 114 may be associated with a vehicle 116 operated by the law enforcement officer (e.g. user 102). Additionally, the oversight entity server 108 may be a network operations controller (NOC) that owes a duty of care to the law enforcement officer (e.g. user 102).

If the parallel execution controller 104 receives user input from more than one device, the parallel execution controller 104 may aggregate each instance user input together to form one instantiation of user input for analysis. The devices may include a user device 106, a mobile infield device 114, or an oversight entity server 108.

In response to analyzing the user input to select a data model and identify input attributes, the parallel execution controller 104 may analyze the selected data model, identify model attributes that are partitionable, and in doing so, selectively partition the data model to form a plurality of sub-models. In some examples, the parallel execution controller 104 may identify model attributes that correlate with the input attributes of the user input.

In any case, each sub-model is configured to be executed independently on a network resource. Thus, the parallel execution controller 104 may schedule a parallel execution of the sub-models across available network resources. Once the analysis of each sub-model is complete, the parallel execution controller 104 may aggregate the results data and respond to the analysis request.

The network resources may include any suitable electronic device that is communicatively coupled to the parallel execution controller 104, such as the oversight entity server 108, the mobile infield device 114, and the user device 106.

The parallel execution controller 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the mobile infield device 114 and the user device 106 via one or more network(s) 112.

The one or more network(s) 112 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g. 5G-NR, LTE, 3G, 2G), or any suitable combination thereof.

Moreover, the mobile infield device 114 and the user device 106 may include any suitable sort of electronic device, such as a television unit, a multimedia streaming device, a cellular phone, a smartphone, a tablet computer, an electronic reader, a media player, a gaming device, a personal computer (PC), a laptop computer, etc. The mobile infield device 114 and the user device 106 may also include network devices that act as intermediaries with the Internet. The Internet is accessible via one or more network(s) 112. In some examples, the mobile infield device 114 and the user device 106 may include a subscriber identity module (SIM), such as an eSIM, to identify each device to a telecommunication service provider (also referred to herein, as "telecommunications network").

Figure 2:
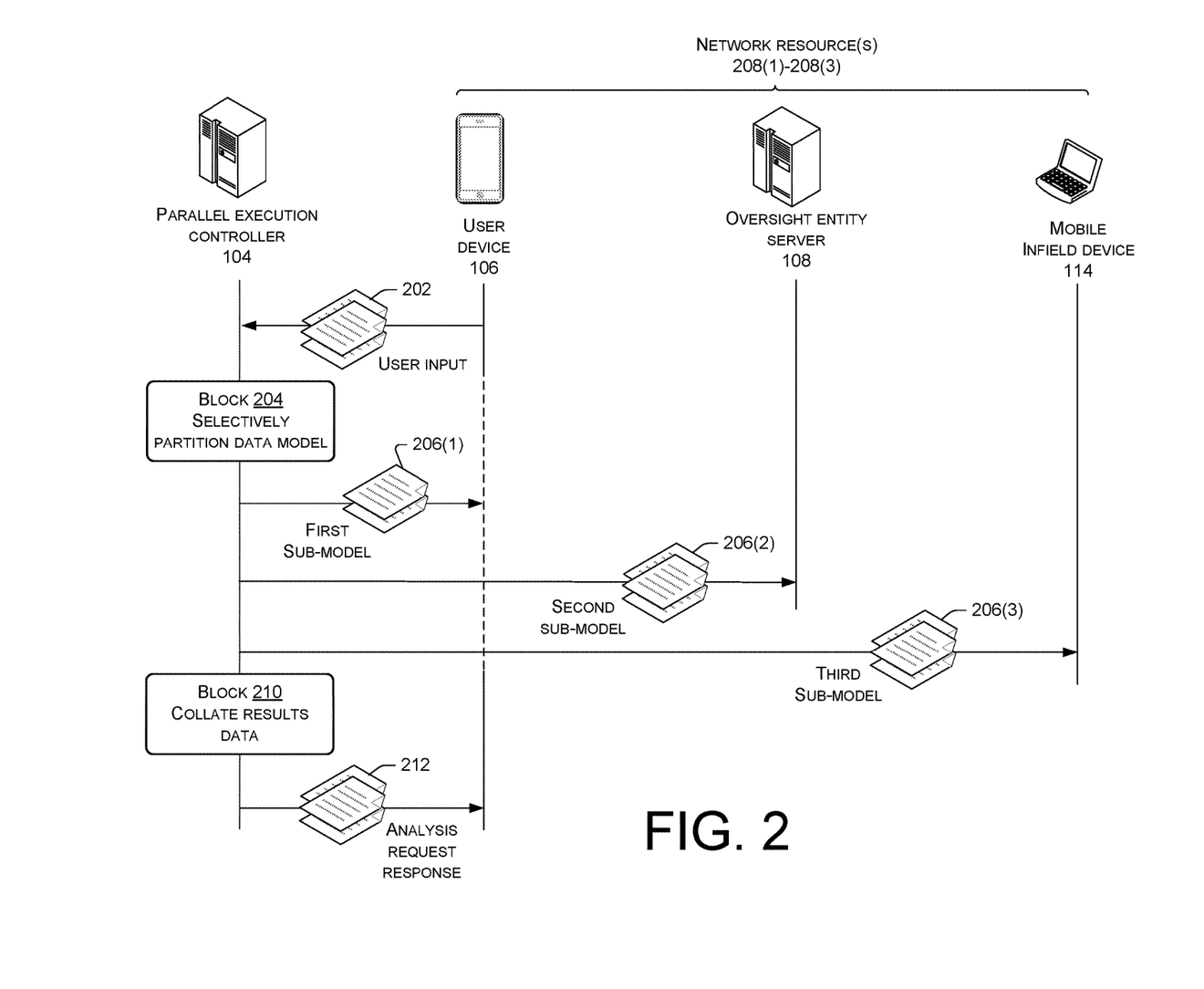
FIG. 2 illustrates a block diagram of an example parallel execution controller that is configured to capture user input from a user device and selectively partition a data model into a plurality of sub-models for parallel execution across available network resources, in accordance with at least one embodiment.

FIG. 2 illustrates a block diagram of an example parallel execution controller that is configured to capture user input from a user device and selectively partition a data model into a plurality of sub-models for parallel execution across available network resources, in accordance with at least one embodiment. In the illustrated example, the parallel execution controller 104 may capture user input 202 from a user device 106. In other examples, the user input 202 may be captured from other electronic devices such as the oversight entity server 108 and the mobile infield mobile device 114. The user input 202 may comprise environmental data and an analysis request. The environmental data may include real-time audio data, visual data, and electronic handshake data captured by the user device 106. The analyst request may denote the intent of the analysis, such as inferring an attending officer's safety during a dispatch event.

The parallel execution controller 104 may use the analysis request of the user input 202 to select a data model. The data model may be used to analyze the environmental data associated with the user input 202. In some examples, the parallel execution controller 104 may analyze the environmental data to identify input attributes, which indicates a dimensionality of the environmental data. Also, the parallel execution controller 104 may analyze the data model to identify model attributes, which indicates a dimensionality of the data model.

At block 204, the parallel execution controller 104 may analyze the model attributes, identify model attributes that are partitionable, and in doing so, selectively partition the data model to form a plurality of sub-models 206(1)-206(3) based on the partitionable model attributes. In the illustrated example, the data model is partitioned into three sub-models 206(1)-206(3), however, one of ordinary skill in the art may appreciate that the number of partitions is a function of the partitionable model attributes, and therefore, any suitable number of sub-models may be created.

Further, the parallel execution controller 104 may determine a processing demand for each of the sub-models 206(1)-206(3). The processing demand may be based on the size of the sub-model data set, the dimensionality of the data set, and the complexity of the algorithms being executed. The determined processing demand may be expressed as an inferred utilization ratio of hardware components and software components that execute each sub-model. Hardware and software components may include processors, core, random access memory, operating system, or any suitable hardware or software component pertinent to the execution of each sub-model.

In addition, the parallel execution controller 104 may analyze available network resource(s) 208(1)-208(3) to process each of the sub-models 206(1)-206(3). The network resource(s) 208(1)-208(3) may include the user device 106, the oversight entity server 108, the mobile infield device 114. and any suitable computing system that is communicatively coupled to the parallel execution controller 104 and is capable of analyzing each of the sub-models 206(1)-206(3). While the network resource(s) 208(1)-208(3) illustrated in FIG. 3 include three network resources, one of ordinary skill in the art may appreciate the number of network resources that may vary as a function of availability at any point in time, and the number sub-models 206(1)-206(3) that require execution.

The parallel execution controller 104 may determine a resource capability of each available network resource(s) 208(1)-208(3), and in doing so, associate each of the sub-models 206(1)-206(3) to a corresponding one of the network resource(s) 208(1)-208(3). In some examples, the parallel execution controller 104 may execute a series of synthetic workloads on each of the network resource(s) 208(1)-208(3) to determine resource capability. The synthetic workloads may be representative of the sub-models 206(1)-206(3). In that regard, each of the sub-models 206(1)-206(3) may be associated with one of the network resource(s) 208(1)-208(3) based on their determined resource capability.

Further, the parallel execution controller 104 may assign each of the sub-models 206(1)-206(3) to execute on one of the network resource(s) 208(1)-208(3), based on the determined processing demand of the sub-models 206(1)-206(3) and the resource capability of the network resource(s) 208(1)-208(3). In the illustrated example, the first sub-model 206(1) may be assigned to the user device 106 (e.g. network resource 208(1)), the second sub-model 206(2) may be assigned to the oversight entity server 108 (e.g. network resource 208(2)), and the third sub-model 206(3) may be assigned to the mobile infield device 114 (e.g. network resource 208(3)).

At block 210, following execution of each of the sub-models 206(1)-206(3) on the network resource(s) 208(1)-208(3), the parallel execution controller 104 may collate the results data and provide an analysis request-response 212 to the user device 106. In the illustrated example, the analysis request-response 212 is sent to the user device 106, based on the analysis request having been received from the user device 106 (e.g. user input 202). In other examples, the analysis request-response 212 may be sent to any suitable electronic device, such as the oversight entity server 108 or the mobile infield device 114.

Figure 3:
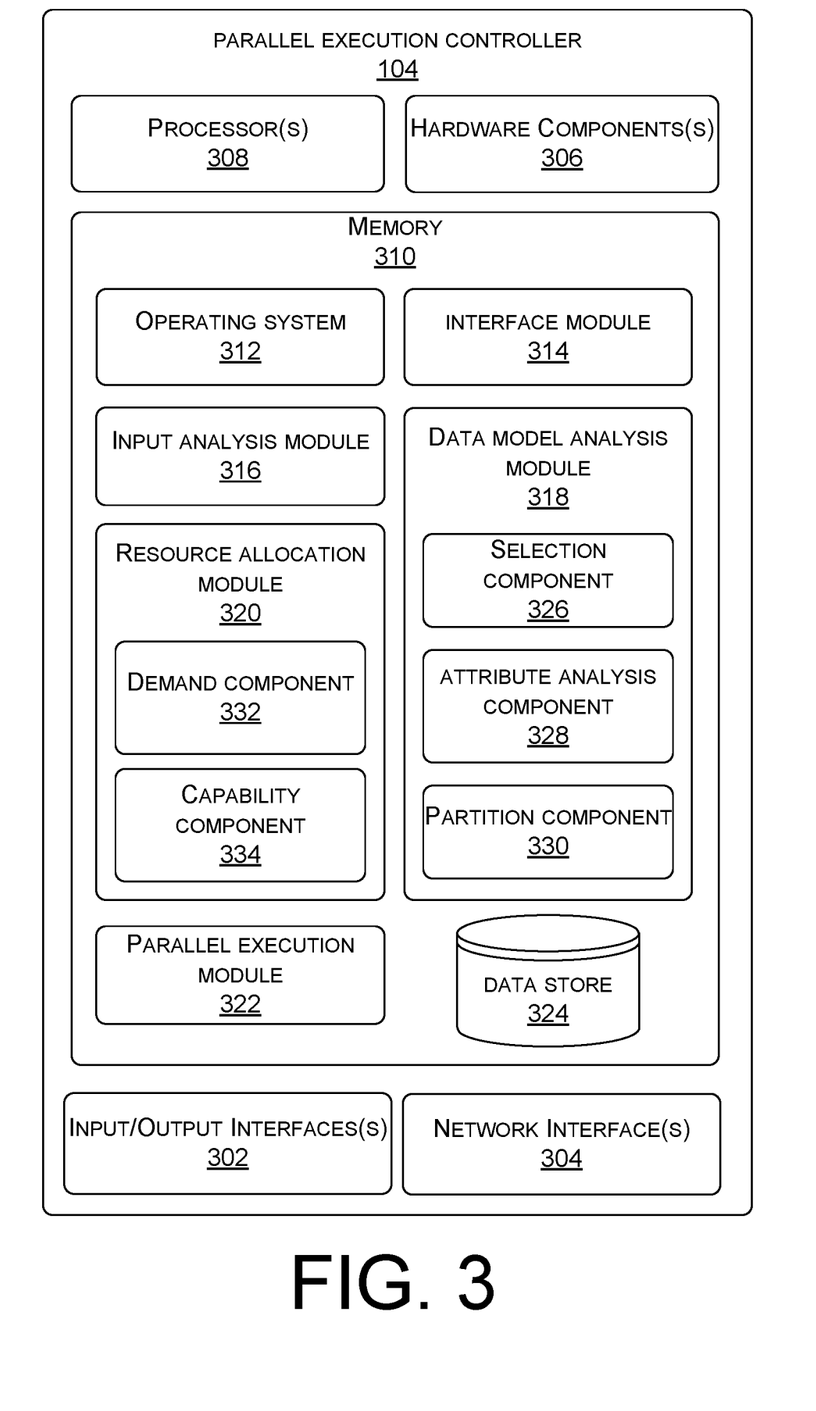
FIG. 3 illustrates various components of an example parallel execution controller.

FIG. 3 illustrates various components of an example parallel execution controller, in accordance with at least one embodiment. The parallel execution controller 104 may be configured to analyze a user input, and in doing so, select a data model to analyze the user inputs. The parallel execution controller 104 may further determine a partitionable state of the data model based on its model attributes, and in response to the data model being partitionable, partition the data model into a plurality of sub-models (e.g. partitioned segments). The sub-models may be configured for parallel execution on available network resources. To assign sub-models to available network resources, the parallel execution controller 104 may analyze the processing demand of individual sub-models and the resource capability of available network resources.

The safety detection controller 108 may include input/output interface(s) 302. The input/output interface(s) 302 may include any suitable type of output interface known in the art, such as a display (e.g. a liquid crystal display), speakers, a vibrating mechanism, or a tactile feedback mechanism. Input/output interface(s) 302 also includes ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the safety detection controller 108 may include network interface(s) 304. The network interface(s) 304 may include any suitable sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the parallel execution controller 104 may include one or more processor(s) 308 that are operably connected to memory 310. In at least one example, the one or more processor(s) 308 may be a central processing unit(s) (CPU), graphics processing unit(s) (GPU), or both a CPU and GPU or any suitable sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any suitable non-transitory medium which can be used to store the desired information.

In the illustrated example, the memory 310 may include an operating system 312, interface module 314, an input analysis model 316, a data model analysis module 318, a resource allocation module 320, a parallel execution module 322, and a data store 324. The operating system 312 may be any suitable operating system capable of managing computer hardware and software resources. The operating system 312 may include an interface layer that enables applications to interface with the input/output interface(s) 302 and the network interface(s) 304.

The interface module 314 may be configured to interact with network resource(s) that are configured to execute a data model or partitioned segments of the data model. The interface module 314 may be further configured to interact with a user device 106 that transmits user input to the parallel execution controller 104 for analysis, or an oversight entity server 108 that is configured to relay user input from the user device 106 to the parallel execution controller 104.

Also, the interface module 314 may be configured to retrieve user input continuously, per a predetermined schedule, or in response to a triggering event. The predetermined schedule may be based on any suitable time interval, such as five seconds, 30 seconds, one minute, or five minutes. Also, the triggering event may correspond to a push from the user device rather than a pull from the parallel execution controller.

The interface module 314 may also determine the availability of network resources continuously, per a predetermined schedule, or in response to a triggering event. The predetermined schedule may be based on any suitable time interval, such as five seconds, 30 seconds, one minute, or five minutes. Also, the triggering event may correspond to receipt of user input for analysis from a client device.

The input analysis module 316 may be configured to analyze a user input received at the interface module 314. The user input may comprise environmental data associated with a user device. Environmental data may include audio data, visual data, and/or so forth. In the context of law enforcement activity, environmental data may be captured by a law enforcement officer's device or vehicle device during a dispatch event. Aside from audio data and visual data, the environmental data may include electronic handshake data of other electronic devices that are proximate to the user device. The electronic handshake data may be based on a communicative interaction between user devices through a wireless communication protocol, such as BLUETOOTH®.

The input analysis module 316 may be used by one or more trained machine-learning algorithms to analyze the user input to identify an analysis request and input attributes. The analysis request may be used by the data model analysis module 318 to select and analyze a data model. In the context of a law enforcement activity, the analysis request may relate to inferring officer safety. In that regard, the parallel execution controller may select a data model that infers an officer's safety.

The input attributes may represent feature characteristics of entity types within the environmental data of the user input. Entity types may include objects, individuals, events, or concepts that are represented within the user input. The input attributes may represent feature characteristics of an entity type, such as an officer identity, physical characteristic, or official departmental rank of a law enforcement officer (e.g. entity type).

Moreover, the input analysis module 316 may receive user input from more than one device, such as a user device, a mobile infield device, or an oversight entity server. In this case, the input analysis module 316 may aggregate each instance of user input together to form one instantiation of user input.

The data model analysis module 318 may further include a selection component 326, an attribute analysis component 328, and a partition component 330. The selection component 326 may be configured to select a data model for analysis based on user input. For example, the user input may include an analysis request. The selection component 326 may analyze the analysis request, and in doing so, select a data model that correlates with the analysis request. Referring to an earlier example, the analysis request may relate to inferring officer safety. In that regard, the selection component 326 may select a data model that infers an officer's safety.

The attribute analysis component 328 may employ one or more trained machine-learning algorithms to analyze the selected data model to identify model attributes and further determine whether the model attributes are partitionable. The attribute analysis component 328 may identify model attributes associated with the selected data model, and in doing so, determine a partitionable state of each model attribute. A model attribute may be partitionable based on it being commutative.

The partition component 330 may employ one or more machine-learning algorithms to partition the selected data model based on model attributes being identified as partitionable, that is, commutative. In one example, the partition component 330 may identify model attributes that correlate with the input attributes of user input. In doing so, the partition component 330 may partition a subset of the commutative model attributes that correlate with the input attributes. Doing so may reduce the processing demand across available network resources. In another example, the partition component 330 may partition the data model based on all, or substantially all, commutative model attributes.

The resource allocation module 320 may further include a demand component 332 and a capability component 334. The demand component 332 may be configured to employ one or more trained machine-learning algorithms to determine a processing demand of each data model, which includes partitioned sub-models and unpartitioned data-model(s). The processing demand may be based on the size of a data model, the dimensionality of the data set associated with each data model, and the complexity of algorithms being executed. The determined processing demand may be expressed as an inferred utilization ratio of hardware components and software components, such as processors, core, random access memory, operating system, or any suitable hardware or software component that is associated with determining a data processing efficiency.

The capability component 334 may be configured to identify network resources that are available to process a data model, or partitioned segments of a data model (e.g. sub-models). The network resources may include any suitable electronic device that is communicatively coupled to the parallel execution controller 104, such as computing systems, mobile computing systems, or mobile devices.

In the context of a law enforcement activity, network resources may include a law enforcement officer's mobile device, a mobile computing device within a law enforcement vehicle, and a dedicated computing system within a network operations center (e.g. oversight entity server 108).

The capability component 334 may further determine a respective resource capability for each available network resource. Resource capability may be based on the hardware or software components of each network resource, such as processor type, core count, random access memory (RAM), operating system, or any suitable hardware or software component that is associated with determining a data processing efficiency.

In some examples, the capability component 334 may employ one or more trained machine-learning algorithms to determine the data processing efficiency of each available network resource. For example, the capability component 334 may generate a synthetic workload that represents a data model or sub-model and further execute the synthetic workload on each network resource to determine its resource capability. The synthetic workload may be based on the processing demand of an individual sub-model, such as processor demand, memory demand, operating system demand, and/or so forth.

In some examples, the capability component 334 may execute a plurality of synthetic workloads on each available network resource to define a relative resource capability across all, or substantially all, available network resources. Each synthetic workload may represent a sub-model or a data model, and the plurality of synthetic workloads may collectively represent all, or substantially sub-models and data models.

The parallel execution module 322 may be configured to assign each sub-model (e.g. partitioned segments of a data model) or data model (e.g. unpartitioned) to execute on an available network resource based at least in part on the processing demand of sub-models or data models and the resource capability of available network resources. The parallel execution module 322 may set an affinity for individual network resources to process assigned sub-model(s) (e.g. partitioned segments of a data model) or a data model (e.g. unpartitioned).

Further, the parallel execution module 322 may be configured to capture results data associated with the execution of each sub-model or the data model. In doing so, the parallel execution module 322 may collate the results data and respond to the analysis request identified by the input analysis module 316. In one example, collation of the results data may involve aggregating instances of results data together to form one instantiation of results data.

The data store 324 may include a repository of data models and partitioned segments of data models, also known as sub-models, that can be used to analyze user input. The data store 324 may further include historical instances of network resource utilization that were associated with executed sub-models (e.g. partitioned segments of a data model). The data store 324 may also include a historical account of processing demand for executed data models and sub-models on available network resources. The data store 324 may also include a repository of synthetic workloads executed on network resources and a repository of resource capability associated with available network resources. Resource capability may be based on the actual execution of data models and/or sub-models on the network resources. Alternatively, resource capability may be based on an inference drawn from the execution of synthetic workloads on the network resources. The data store 324 may also include any suitable data pertinent to the operation of the parallel execution controller 104.

Further, the parallel execution controller 104, via various modules and components may make use of one or more trained machine-learning algorithms such as supervised learning, unsupervised learning, semi-supervised learning, naive Bayes, Bayesian network, decision trees, neural networks, fuzzy logic models, and/or probabilistic classification models.

Figure 4:
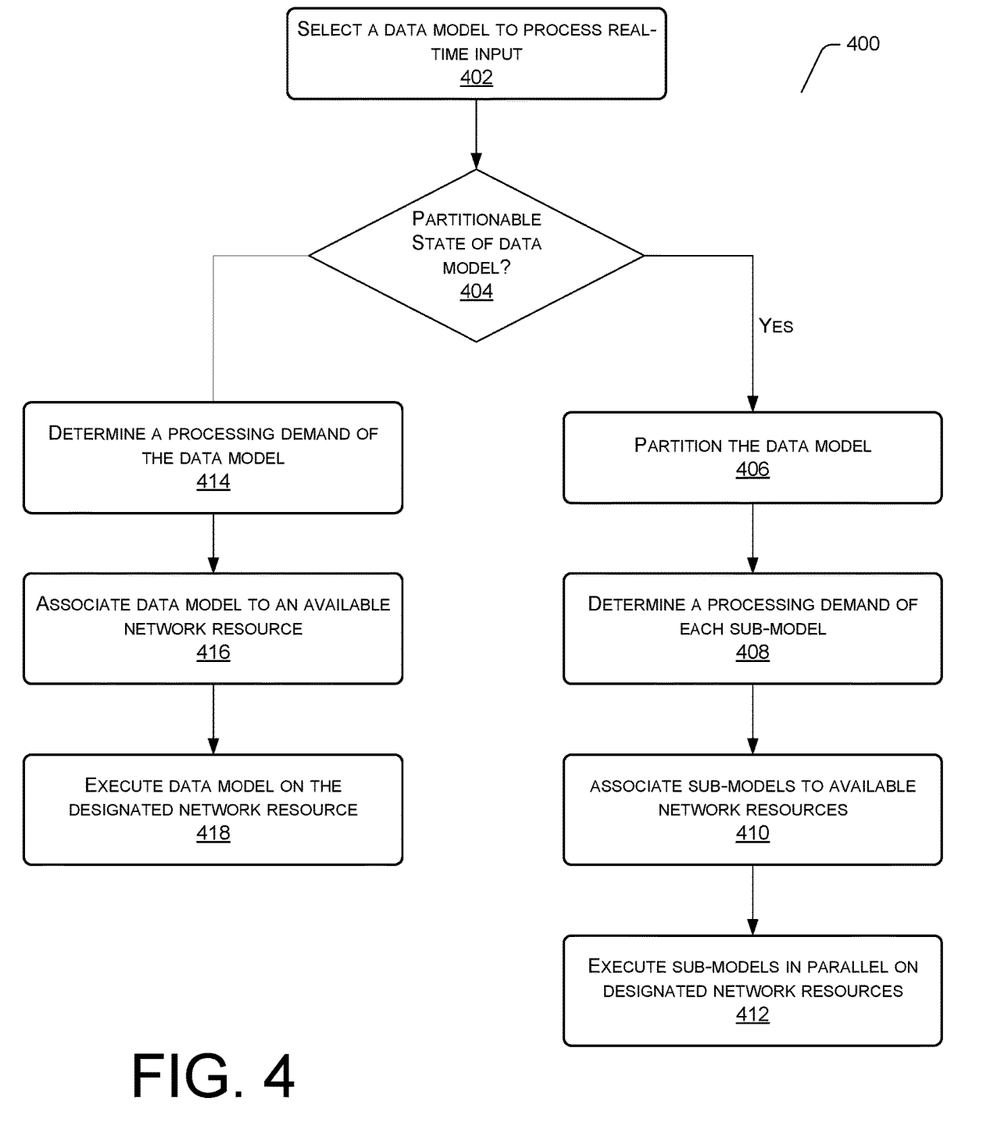
FIG. 4 illustrates an example process for partitioning a data model and associating partitioned segments of the data model to the available network resources, in accordance with at least one embodiment.
Figure 5:
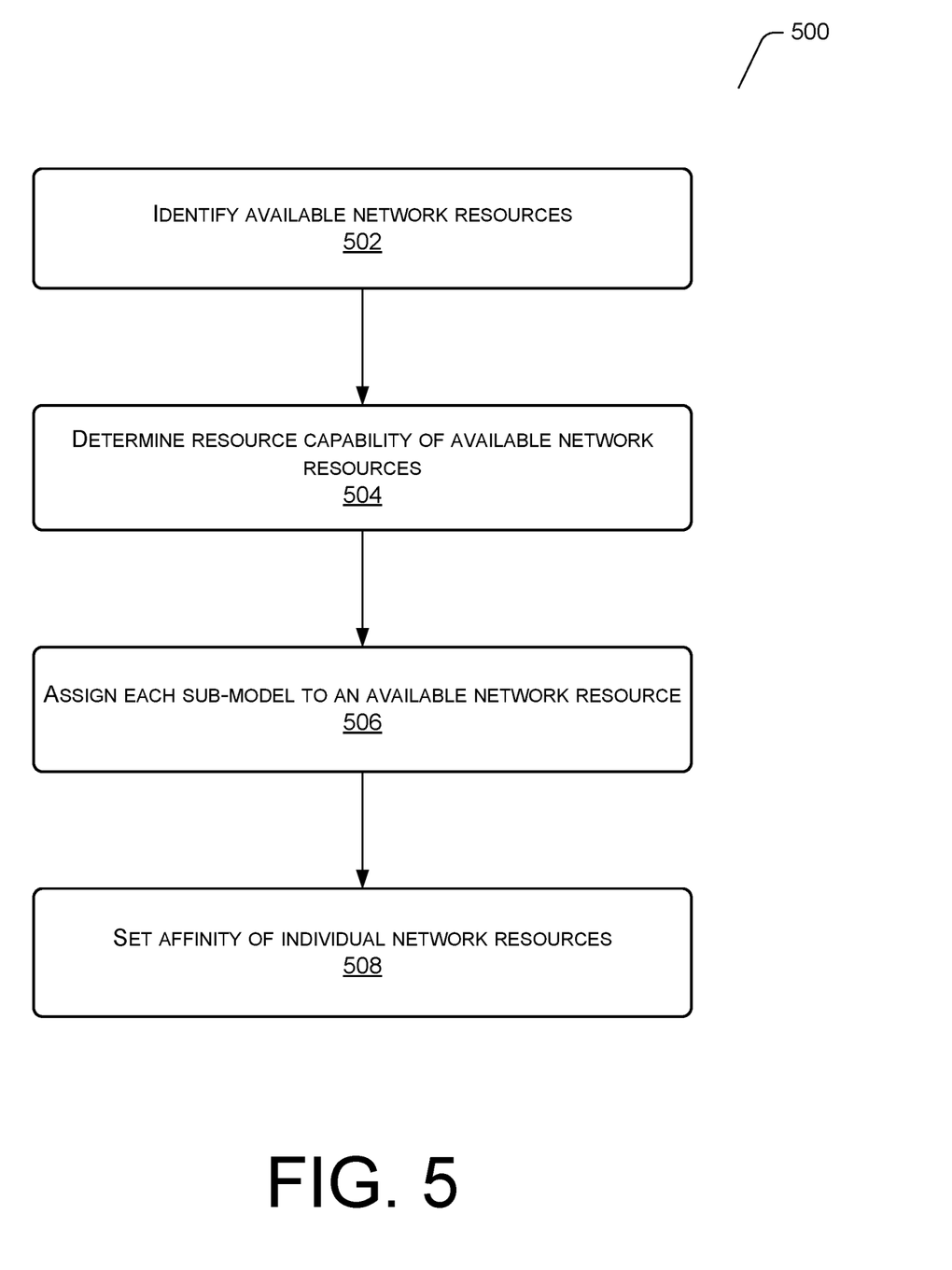
FIG. 5 illustrates an example process for identifying a network resource to process a partitioned segment of a data model, in accordance with at least one embodiment.
Figure 6:
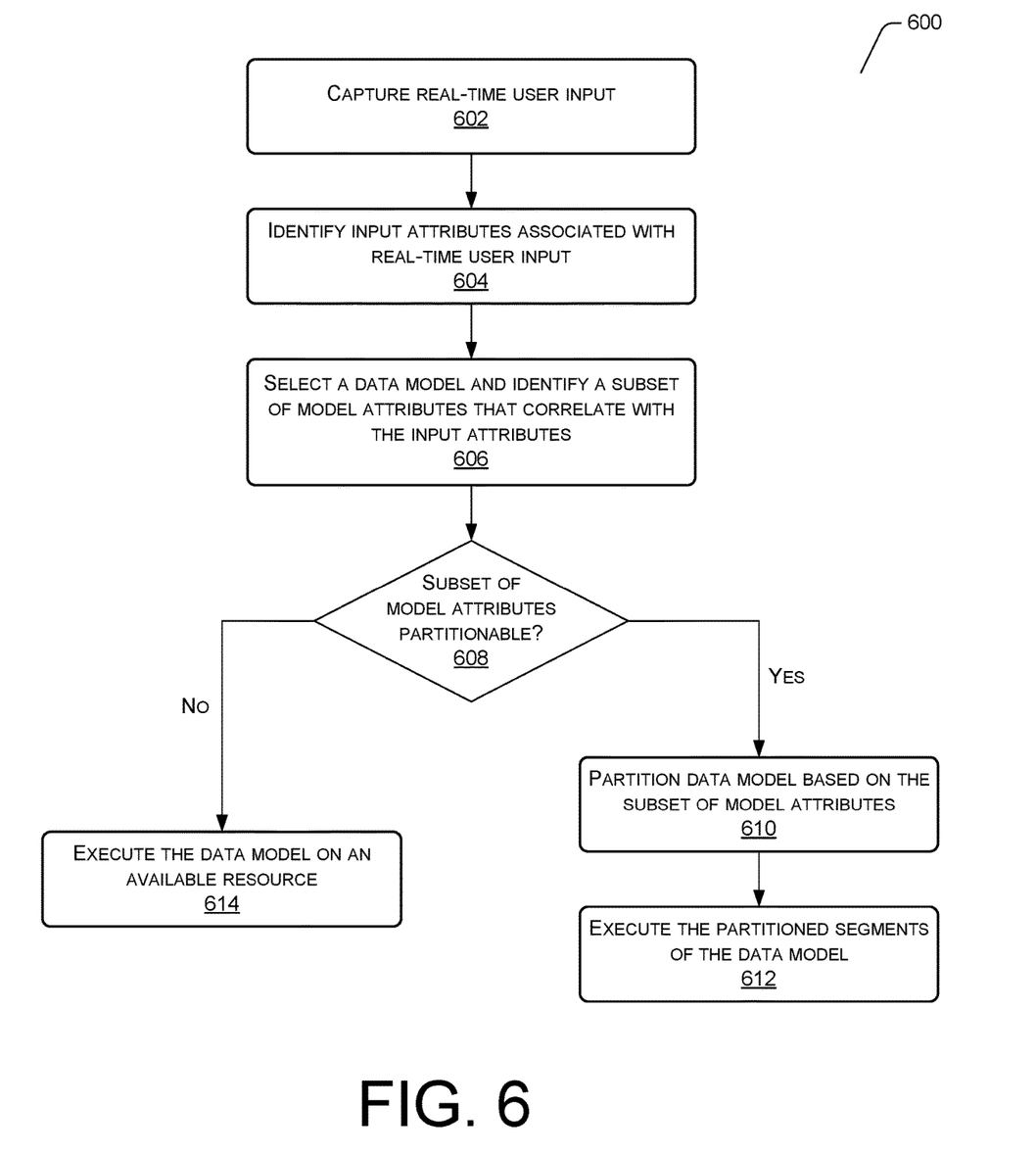
FIG. 6 illustrates an example process for partitioning a data model and analyzing partitioned segments of the data model based on real-time user input, in accordance with at least one embodiment.

FIGS. 4, 5, and 6 present processes 400, 500, and 600 that relate to operations of the Parallel execution controller 104. Each of processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any suitable number of the described blocks can be combined in any suitable order and/or in parallel to implement the process. For discussion purposes, the processes 400, 500, and 600 are described with reference to the computing environment 100 of FIG. 1.

FIG. 4 illustrates an example process for partitioning a data model and associating partitioned segments of the data model to the available network resources, in accordance with at least one embodiment. Process 400 is described from the perspective of the parallel execution controller, which is configured to analyze real-time user input relative to a data model.

At 402, the parallel execution controller may select a data model to process real-time user input. The parallel execution controller may receive the user input directly from a user device or via an intermediary oversight entity, such as a NOC.

The user input may include an analysis request. The analysis request may be used by the parallel execution controller to select an appropriate data model. In the context of a law enforcement activity, the analysis request may relate to inferring officer safety. In that regard, the parallel execution controller may select a data model that infers an officer's safety.

At 404, the parallel execution controller may determine a partitionable state of the data model. In one example, a data model may be partitionable based on its underlying model attributes being commutative. Consider a data model that is executed before a data set is removed and after the data set is recombined. For example, consider a first set of results data that is based on a data model with a particular data set in place, and a second set of results data based on a data model where the particular data set was removed and then re-combined. If the first set of results data and the second set of results data are the same, then the integrity of the data model is said to have been maintained.

At 406, the parallel execution controller may determine that the data model is partitionable based on commutative model attributes. In doing so, the parallel execution controller may partition the data model based on the commutative model attributes. The partitioned segments of the data model each represent a sub-model that may be shared, re-used, incrementally upgraded, and re-combined with other partitioned segments (e.g. other sub-models) to re-form the data model.

At 408, the parallel execution controller may determine a processing demand associated with each sub-model. The processing demand may be based on the size of the sub-model data set, the dimensionality of the data set, and the complexity of algorithms being executed. In some examples, the parallel execution controller may employ one or more trained machine-learning algorithms to infer a processing demand.

At 410, the parallel execution controller may identify available network resources and associate each sub-model with an available network resource based at least in part on the processing demand. Available network resources may include non-homogeneous computing devices, such as dedicated computing systems, mobile computing systems, or personal mobile devices.

At 412, the parallel execution controller may execute each of the sub-models, in parallel, on their respectively designated network resources. In turn, the parallel execution controller may retrieve the results data from each sub-model and aggregate the results data to create an aggregated set of results data. The aggregated set of results data may be delivered to the user device that initiated the analysis request, or any suitable user device that is identified as an intended recipient.

At 414, the parallel execution controller may determine that the data model includes non-commutative model attributes, and therefore is not a candidate for partitioning into sub-models. In this instance, the parallel execution controller may determine a processing demand associated with the data model based on the size and dimensionality of the data model, and the complexity of algorithms being executed.

At 416, the parallel execution controller may identify an available network resource to process the data model based on the processing demand. The available network resource may include a dedicated computing system, a mobile computing system, or a personal mobile device.

At 418, the parallel execution controller may execute the data model on the designated network resource. The subsequent results data may be delivered to the user device as a response to the analysis request, or any other user device that is identified as an intended recipient.

FIG. 5 illustrates an example process for identifying a network resource to process a partitioned segment of a data model, in accordance with at least one embodiment. Process 500 is described from the perspective of the parallel execution controller, which is configured to identify available network resources and further their respective resource capability.

At 502, the parallel execution controller may identify network resources that are available to process partitioned segments of a data model, also referred to as sub-models. The network resources may include any suitable electronic devices that are communicatively coupled to the parallel execution controller, such as computing systems, mobile computing systems, or mobile devices.

In the context of a law enforcement activity, network resources may include a law enforcement officer's mobile device, a mobile computing device within a law enforcement vehicle, and a dedicated computing system within a network operations center.

At 504, the parallel execution controller may analyze each available network resource to determine its respective resource capability. Resource capability may be based on the hardware or software components of each network resource, such as processor type, core count, random access memory (RAM), operating system, or any suitable hardware or software component that is associated with determining a data processing efficiency.

In some examples, the parallel execution controller may employ one or more trained machine-learning algorithms to determine a resource capability based on a synthetic workload. For example, the parallel execution controller may generate a synthetic workload that represents a sub-model and further execute the synthetic workload on each network resource to determine its resource capability. The synthetic workload may be based on the processing demand of an individual sub-model, such as processor demand, memory demand, operating system demand, and/or so forth.

The parallel execution controller may generate synthetic workloads for each sub-model and execute each synthetic workload on the available network resources. Doing so provides a relative comparison of the resource capability associated with each sub-model, across all network resources.

At 506, the parallel execution controller may assign each sub-model to an available network resource based at least in part on the process demand of each sub-model and the resource capability of each available network resource.

At 508, the parallel execution controller may set an affinity for individual network resources to process assigned sub-models. Setting an affinity enables the binding and unbinding of a process or thread to the network resource such that the process or thread will execute only on the designated network resource, rather than on any network resource. Setting an affinity may also reduce cache problems because there is no delay when the same individual network resource is used.

FIG. 6 illustrates an example process for partitioning a data model and analyzing partitioned segments of the data model based on real-time user input, in accordance with at least one embodiment. Process 600 is described from the perspective of the parallel execution controller, which is configured to receive the real-time user input, partition a data model into a plurality of segments, and initiate network resources to execute each partitioned segment of the data model.

At 602, the parallel execution controller may receive real-time user input. The user input may be received in real-time or near-real-time from a user device. The term "real-time" refers to an instantaneous receipt of user input at the parallel execution controller relative to the actual time that the user input was created. For example, user input may be a live stream of multimedia content that is sent instantaneously as it is being generated, to the parallel execution controller. Near real-time refers to a temporal delay between the time that the user input was generated at the user device and the time that it is received at the parallel execution controller. The time delay may be based on any suitable time interval such as ten milliseconds, one second, ten seconds, thirty seconds, or one minute.

The real-time user input may comprise environmental data captured at the user device. Environmental data may include audio data, visual data, and/or so forth. The real-time user input may include an analysis request. The analysis request may be used by the parallel execution controller to select an appropriate data model.

At 604, the parallel execution model may analyze the user input to identify input attributes that are likely to correlate with model attributes of a data model. For example, the input attributes may represent feature characteristics of entity types within the user input. Entity types may include objects, individuals, events, or concepts that are represented within the user input. The input attributes may represent feature characteristics of an entity type, such as an officer identity, physical characteristic, or official departmental rank of a law enforcement officer (e.g. entity type).

At 606, the parallel execution controller may select a data model based on the analysis request, and in doing so, further analyze the data model to identify a subset of model attributes that correlate with the input attributes. In some examples, the subset of model attributes may correspond to a portion, but not all, of the model attributes of the data model. In other examples, the subset of model attributes may correspond to all, or substantially all, of the model attributes of the data model.

At 608, the parallel execution controller may determine whether the subset of model attributes (e.g. model attributes that correlate with the input attributes of the user input) are partitionable. In one example, the partitionable state of the data model is based on the subset of model attributes being commutative.

At 610, the parallel execution controller may determine that the data model is partitionable based on the subset of model attributes being commutative. In doing so, the parallel execution controller may partition the data model based on the commutative model attributes. The subset of model attributes may include commutative model attributes and non-commutative model attributes. The parallel execution controller may partition the data model based on the commutative model attributes of the subset of model attributes. The non-commutative model attributes of the data model remain unpartitioned.

At 612, the parallel execution controller may execute the partitioned segments of the data model, in parallel, on available network resources. The process for executing the partitioned segments of the data model, also known as sub-models, in parallel, is described in more detail with reference to process 400.

At 614, the parallel execution controller may determine that the data model is not partitionable based on the subset of model attributes comprising of non-commutative model attributes. In this instance, the parallel execution controller may execute the data model on an available network resource. The process for executing the data model on an available network resource is described in more detail with reference to process 400.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
under control of one or more processors:
identifying model attributes associated with a data model, the data model comprising a data set, and individual model attributes corresponding to one or more entity types represented in the data set;
determining that at least a commutative portion of the data set is commutative based at least in part on determining that at least some of the model attributes corresponding to one or more entity types represented in the data set are commutative;

determining a partitionable state of the data model, based at least in part on the determined commutative portion of the data set;

partitioning the data model based at least in part on the partitionable state;

determining one or more processing demands of individual partitioned segments of the data model based at least in part on one or more trained machine-learning algorithms corresponding to the one or more processing demands;

assigning the individual partitioned segments of the data model to individual network devices based at least in part on corresponding determined processing demands;

executing, by the individual network devices, the individual partitioned segments of the data model;

capturing, from the individual network devices, a set of results data associated with the execution of the individual partitioned segments; and combining the set of results data into an aggregated set of results data.

2. The computer-implemented method of claim 1, wherein the partitionable state indicates whether the model attributes are partitionable from the data model to form the individual partitioned segments, and whether the individual partitioned segments are re-combinable to re-form the data model.

3. The computer-implemented method of claim 1, further comprising:

analyzing the individual network devices to determine device capability; and selecting the individual network devices to process the individual partitioned segments, based at least in part on the device capability.

4. The computer-implemented method of claim 1, further comprising:

setting an affinity of the individual network devices to process the individual partitioned segments.

5. The computer-implemented method of claim 1, further comprising:

receiving, from a user device, near-real-time input for analysis via the data model, and wherein, the analysis of the individual partitioned segments of the data model is based at least in part on the near-real-time input.

6. The computer-implemented method of claim 5, further comprising:

analyzing the near-real-time input to identify input attributes, and wherein partitioning the data model is further based at least in part on the input attributes.

7. The computer-implemented method of claim 1, wherein the determining that at least some of the model attributes corresponding to one or more entity types represented in the data set are commutative is based at least in part on one or more machine-learning algorithms trained to identify commutative model attributes.

8. The computer-implemented method of claim 1, wherein the partitioning of the data model is further based at least in part on one or more machine-learning algorithms trained to reduce processing demand across available network resources.

9. The computer-implemented method of claim 1, further comprising determining a data processing efficiency of individual network devices based at least in part on one or more machine-learning algorithms trained to determine data processing efficiency, and wherein the assigning of the individual partitioned segments of the data model to the individual network devices is further based at least in part on the corresponding data processing efficiency.

10. One or more non-transitory computer-readable media collectively storing computer-executable instructions that, when executed with one or more computers, collectively cause the computers to perform acts comprising:

receiving, from a user device, a user input for analysis via a data model;

analyzing the user input to identify input attributes;

partitioning the data model into individual partitioned segments, based at least in part on the input attributes;

determining one or more processing demands of individual partitioned segments of the data model based at least in part on one or more trained machine-learning algorithms corresponding to the one or more processing demands;

assigning the individual partitioned segments of the data model to the individual network devices based at least in part on corresponding determined processing demands;

executing, by the individual network devices, the individual partitioned segments of the data model;

capturing, from the individual network devices, a set of processed data associated with the execution of the individual partitioned segments; and combining the set of processed data to create an aggregate set of processed data.

11. The one or more non-transitory computer-readable media of claim 10, wherein the user input includes entity types, the entity types comprising one or more of: objects, individuals, events, or concepts, and wherein, the input attributes correspond to feature characteristics of the entity types.

12. The one or more non-transitory computer-readable media of claim 10, wherein the acts further comprise:

identifying model attributes associated with the data model, the data model comprising a data set, and individual model attributes corresponding to one or more entity types represented in the data set;

determining that at least a commutative portion of the data set is commutative based at least in part on determining that at least some of the model attributes corresponding to one or more entity types represented in the data set are commutative; and wherein, partitioning the data model is further based at least in part on the determined commutative portion of the data set.

13. The one or more non-transitory computer-readable media of claim 12, wherein the model attributes comprise of a first set of model attributes that are commutative and a second set of model attributes that are non-commutative, and wherein, the partitioning of the data model is based at least in part on the first set of model attributes.

14. The one or more non-transitory computer-readable media of claim 10, wherein the acts further comprise:

determining a device capability of the individual network devices that are available to process the user input; and associating the individual partitioned segments to the individual network devices based at least in part on the device capability.

15. The one or more non-transitory computer-readable media of claim 10, wherein analyzing the user input to identify input attributes comprises identifying the input attributes in the user input based at least in part on one or more machine-learning algorithms trained to identify input attributes.

16. A system, comprising:
one or more processors; and
memory storing one or more computer-readable instructions that, if executed by the one or more processors, cause the one or more processors to perform acts comprising:
identifying individual network devices that are available to process a data model;
identifying model attributes associated with the data model, the data model comprising a data set, and individual model attributes corresponding to one or more entity types represented in the data set;
determining that at least a commutative portion of the data set is commutative based at least in part on determining that at least some of the model attributes corresponding to one or more entity types represented in the data set are commutative;
partitioning the data model to create individual partitioned segments based at least in part on the determined commutative portion of the data set;
determining one or more processing demands of individual partitioned segments of the data model based at least in part on one or more trained machine-learning algorithms corresponding to the one or more processing demands;
assigning the individual partitioned segments of the data model to the identified individual network devices based at least in part on corresponding determined processing demands;
executing, by the individual network devices, the individual partitioned segments of the data model;
capturing, from the individual network devices, a set of results data associated with the execution of the individual partitioned segments; and
combining the set of results data into an aggregated set of results data.

17. The system of claim 16, wherein the acts further comprise:
determining a computational demand for processing the data model, based at least in part on the subset of the model attributes being non-commutative, and
initiating an analysis of the data model at one of the individual network devices, based at least in part on the computational demand.

18. The system of claim 16, wherein the acts further comprise:
set an affinity of the individual network devices to process the partitioned segments of the data model.

19. The system of claim 16, wherein the acts further comprise:
identifying entity types associated with the near-real-time input, the entity types being one of objects, individuals, events, or concepts;
analyzing the entity types to identify input attributes, the input attributes being feature characteristics of the entity types; and
partitioning the data model based at least in part on the input attributes.

* * * * *